(12) United States Patent
Shimada et al.

(10) Patent No.: US 7,990,830 B2
(45) Date of Patent: Aug. 2, 2011

(54) OPTICAL PICKUP, OPTICAL INFORMATION RECORDING APPARATUS AND OPTICAL INFORMATION RECORDING AND REPRODUCING APPARATUS USING THE OPTICAL PICKUP

(75) Inventors: Kenichi Shimada, Yokohama (JP); Tatsuro Ide, Kawasaki (JP); Kevin R. Curtis, Longmont, CO (US); Ken E. Anderson, Longmont, CO (US)

(73) Assignees: Hitachi, Ltd., Tokyo (JP); InPhase Technologies Inc., Longmont, CO (US)

( * ) Notice: Subject to any disclaimer, the term of this patent is extended or adjusted under 35 U.S.C. 154(b) by 600 days.

(21) Appl. No.: 12/038,150

(22) Filed: Feb. 27, 2008

(65) Prior Publication Data
US 2008/0225670 A1 Sep. 18, 2008

Related U.S. Application Data

(60) Provisional application No. 60/905,838, filed on Mar. 9, 2007.

(51) Int. Cl.
*G11B 7/00* (2006.01)
(52) U.S. Cl. ............. 369/103; 365/125; 365/126; 359/1
(58) Field of Classification Search .................. 369/103; 385/37; 359/1; 365/125, 126
See application file for complete search history.

(56) References Cited

U.S. PATENT DOCUMENTS
2004/0179251 A1 9/2004 Anderson et al.

FOREIGN PATENT DOCUMENTS
JP 2004-272268 9/2004

OTHER PUBLICATIONS

"InPhase Technologies Invention Disclosure", Doc. 86-1206-1, Jan. 2006.*
U.S. Appl. No. 60/905,837, filed Mar. 9, 2007, Ide et al.
Ian Redmond : "Beam Delivery in Monocular Holographic Data Storage System", Technical Digest ODS (2006), MA1.
The InPhase Professional Archive Drive OMA: Design and Function, Redmond et al, Technical Digest ODS (2006) MA1.

* cited by examiner

*Primary Examiner* — William J Klimowicz
*Assistant Examiner* — Andrew J Sasinowski
(74) *Attorney, Agent, or Firm* — Antonelli, Terry, Stout & Kraus, LLP.

(57) ABSTRACT

In holographic recording, it is important to form stably an interference fringe between a reference beam and a signal beam in a holographic storage medium. To suppress factors degrading stability of the interference fringe, such as fluctuation of atmospheric air, position displacement of optical components and the like during propagation of the reference and signal beams, an optical pickup and an optical information recording/reproducing apparatus adopt an optical system structure providing a higher proportion of optical components shared by the reference and signal beams optical path than conventional optical system structure. To increase the proportion of shared optical components, the signal beam and the reference beam pass through the PBS prism as parallel beams and a concave lens is placed on a reference beam path just before the objective lens.

6 Claims, 6 Drawing Sheets

OBJECTIVE LENS
BACK FOCUS PLANE

OPTICAL PICKUP, OPTICAL INFORMATION RECORDING APPARATUS AND OPTICAL INFORMATION RECORDING AND REPRODUCING APPARATUS USING THE OPTICAL PICKUP

INCORPORATION BY REFERENCE

The present application claims priority from U.S. Provisional Application Ser. No. 60/905,838 filed on Mar. 9, 2007, the content of which is hereby incorporated by reference into this application.

CROSS-REFERENCE TO RELATED APPLICATION

The present application relates to subject matter described in application Ser. No. 12/038,174 filed on Feb. 27, 2008, entitled "OPTICAL PICKUP, OPTICAL INFORMATION RECORDING AND REPRODUCING APPARATUS AND METHOD FOR OPTICALLY RECORDING AND REPRODUCING INFORMATION" by Tatsuro IDE, Kenichi SHIMADA, Masahiko TAKAHASI, Takeshi SHIMANO, Kevin R. CURTIS and Ken E. ANDERSON, claiming priority from U.S. provisional application Ser. No. 60/905,837, filed on Mar. 9, 2007. The entire content of the related application is incorporated herein by reference.

BACKGROUND OF THE INVENTION

The present invention relates to an optical pickup for recording/reproducing information by utilizing holography technologies, an optical information reproducing apparatus and an optical information recording/reproducing apparatus both utilizing the optical pickup.

Optical discs having a recording density of about 50 GB are now commercially available even for public use, which discs use blue-violet semiconductor laser beams and rely upon Blu-Ray Disc (BD) specifications, High Definition Digital Versatile Disc (HD DVD) specifications and the like. Now, optical discs that will have a capacity as large as a Hard Disc Drive (HDD) having a capacity of e.g., 100 GB to 1 TB are desired.

However, in order to realize such an ultra high density of an optical disc, high density techniques of a new scheme is required which are different from conventional high density techniques which resort to a shorter wavelength and a high objective lens NA.

Researches of next generation storage techniques are under progress, and holographic recording techniques have been paid attention. The holographic recording techniques are techniques of superposing in a recording medium a signal beam having information on page data two-dimensionally modulated by a spatial light modulator and a reference beam and causing refraction index modulation in the recording medium in accordance with an interference fringe formed upon superposition to thereby record information in the recording medium.

For information reproduction, upon application of the reference beam used for recording to the recording medium, a diffraction beam is generated because holograms recorded in the recording medium function as diffraction grating. This diffraction beam is reproduced as the same beam as the recorded signal beam including phase information.

The reproduced signal beam is detected two-dimensionally at high speed with an optical detector such as CMOS and CCD. According to the holographic recording techniques, by using one hologram, two-dimensional information can be recorded in an optical recording medium at a time and this information can be reproduced. Since a plurality of sets of page data can be written in a superposed manner in an area of a recording medium, it is possible to realize recording/reproducing information of a large capacity at high speed.

Hologram recording techniques are described, for example, in JP-A-2004-272268 (Patent Document 1). This publication describes a so-called angle multiplex recording method by which a signal beam is converged to an optical information recording medium via a lens, at the same time a reference beam as a parallel beam is applied to be interfered with the signal beam and record a hologram, and while an incidence angle of the reference beam upon the optical information recording medium is changed, different page data is displayed on a spatial light modulator to perform multiplex recording. This publication also describes the techniques that a space between adjacent holograms can be made short by disposing an aperture or opening (spatial filter) at a beam waist of the signal beam converged by a lens so that recording density/capacity can be increased more than a conventional angle multiplex recording method.

Technical Digest ODS (2006), MA1 (Non-Patent Document 1) by Ian Redmond describes that in reproducing information recorded in an optical information recording medium, a phase conjugate beam of a reference beam is used to dispose a photodetector for signal detection on the same side as other optical components relative to the optical information recording medium so that the apparatus can be made compact.

SUMMARY OF THE INVENTION

In holographic recording, it is important to form stably an interference fringe, from the viewpoint of improving a recording quality. To this end, it is important to maintain constant an optical path length difference so as not to change the optical path length difference between a signal beam and a reference beam. If optical components shared by a signal beam optical path and a reference beam optical path have a large proportion, both the signal beam and reference beam have a similar change in an optical path length to be caused by fluctuation of atmospheric air, position displacement of optical components and the like during light propagation. It is therefore possible to cancel out the changes. However, as indicated by Non-Patent Document 1, in the structure of conventional optical system, a light beam emitted from a laser light source is split into a signal light beam and a reference light beam at an intermediate position of an optical path toward an optical information recording medium, and thereafter these light beams propagate a relatively long distance along different optical paths. This results in a large apparatus and a change in the optical path length difference between the signal beam and reference beam.

The present invention aims to make compact the apparatus and improve a recording quality, and provides an optical system structure having a larger proportion of optical components shared by a signal light beam path and a reference light beam path than a conventional proportion, while a structure of adopting an angle multiplex recording method by applying a reference beam as a parallel beam to an information recording medium is adopted similarly to a conventional structure.

The object of the present invention can be achieved, for example, by applying a reference beam and a signal beam to a PBS prism as generally parallel beams and disposing a concave lens in an optical path before an objective lens upon which the reference beam output from the PBS prism becomes incident.

The proportion of optical components shared by a signal light beam path and a reference light beam path becomes larger than that of the conventional structure. This structure is effective for making compact the apparatus, and it is possible to mitigate a variation in an optical path length difference between a signal beam and a reference beam to be caused by fluctuation of atmospheric air, position displacement of optical components and the like during light propagation, resulting in an improved recording quality.

These and other features, objects and advantages of the present invention will become more apparent from the following description when taken in conjunction with the accompanying drawings.

DETAILED DESCRIPTION OF THE EMBODIMENTS

Embodiments of the present invention will now be described with reference to the accompanying drawings.

Figure 7:
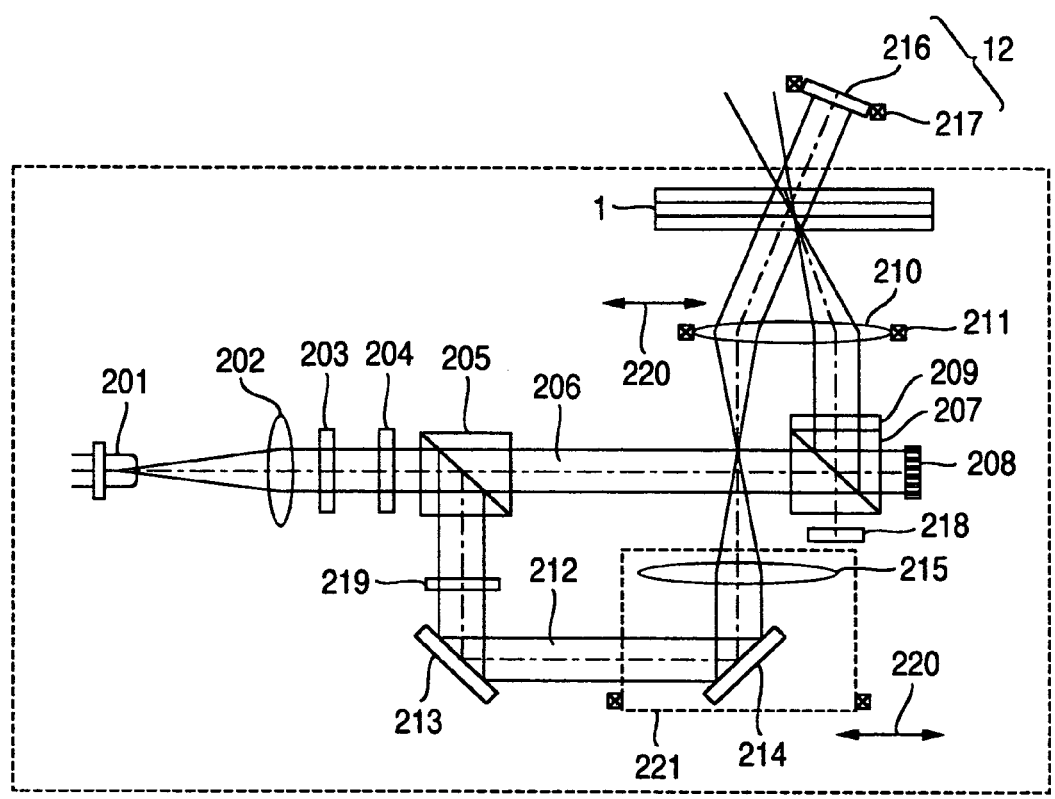
FIG. 7 is a schematic diagram showing an optical pickup according to an embodiment.

As shown in FIG. 7, for example, a structure that a signal beam and a reference beam are applied to the same objective lens is adopted. It is therefore possible to make the proportion of optical components shared by a signal light beam path and a reference light beam path larger than that of the conventional structure such as shown in Non-Patent Document 1. This structure is effective for making compact the apparatus, and it is possible to mitigate a variation in an optical path length difference between a signal beam and a reference beam to be caused by fluctuation of atmospheric air, position displacement of optical components and the like during light propagation.

In this embodiment, as shown in FIG. 7, an optical beam emitted from a light source 201 transmits through a collimator lens 202 and becomes incident upon a shutter 203. While the shutter 203 is open, the optical beam passes through the shutter 203, and thereafter a polarization direction is controlled by a polarization direction conversion element 204 such as a half wavelength plate or a liquid crystal device to make the optical beam have a desired light amount ratio of a P polarized light beam and an S polarized light beam, and then the polarized light beams become incident upon a PBS prism 205.

The light beam passed through the PBS prism 205 becomes incident upon a spatial light modulator 208 via a PBS prism 207.

A signal optical beam 206 added with information by the spatial light modulator 208 is reflected by the PBS prism 207, and propagates through an angle filter 209 which allows only an optical beam having a predetermined incidence angle to pass. Thereafter, the signal optical beam is converged upon an optical information recording medium 1 via an objective lens 210.

An optical beam reflected by the PBS prism 205 functions as a reference optical beam 212, is made to have a polarization direction predetermined for recording/reproducing by a polarization conversion element 219, and thereafter becomes incident upon a lens 215 via mirrors 213 and 214.

The lens 215 takes a role of converging the reference optical beam 212 upon a back focus plane of the objective lens 210. The reference optical beam converged upon the back focus plane of the objective lens 210 is changed again to a parallel beam by the objective lens 210, and becomes incident upon the optical information recording medium 1.

The objective lens 210 or an optical block 221 can be driven, for example, along a direction represented by reference number 220. By displacing the position of the objective lens 210 or an optical block 221 along the drive direction 220, a relative positional relation between the objective lens 210 and the convergence point on the back focus plane of the objective lens 210 changes. It is therefore possible to set an incidence angle of the reference optical beam incident upon the optical information recording medium 1 to a desired angle.

As the signal optical beam and reference optical beam are made incident upon the optical information recording medium 1 in a superposed manner, an interference fringe pattern is formed in the recording medium. By writing this pattern in the recording medium, information can be recorded. By displacing the position of the objective lens 210 or optical block 221 along the drive direction 220, an incidence angle of the reference optical beam incident upon the optical information recording medium 1 can be changed so that angle multiplex recording can be performed.

The structure that the angle multiplex recording is realized by applying the signal beam and reference beam to the same objective lens and scanning the objective lens in a lateral direction, is referred to as a monocular system in the following embodiments.

In reproducing recorded information, as described previously, the reference optical beam is applied to the optical information recording medium 1, and the optical beam transmitted through the optical information recording medium 1 is reflected by a galvano mirror 216 to form its phase conjugate beam.

A reproduction optical beam reproduced by the phase conjugate beam propagates through the objective lens 210 and angle filter 209. Thereafter, the reproduction optical beam transmits through the PBS prism 207, and becomes incident upon the photodetector 218 so that the recorded signal can be reproduced.

Figure 1:
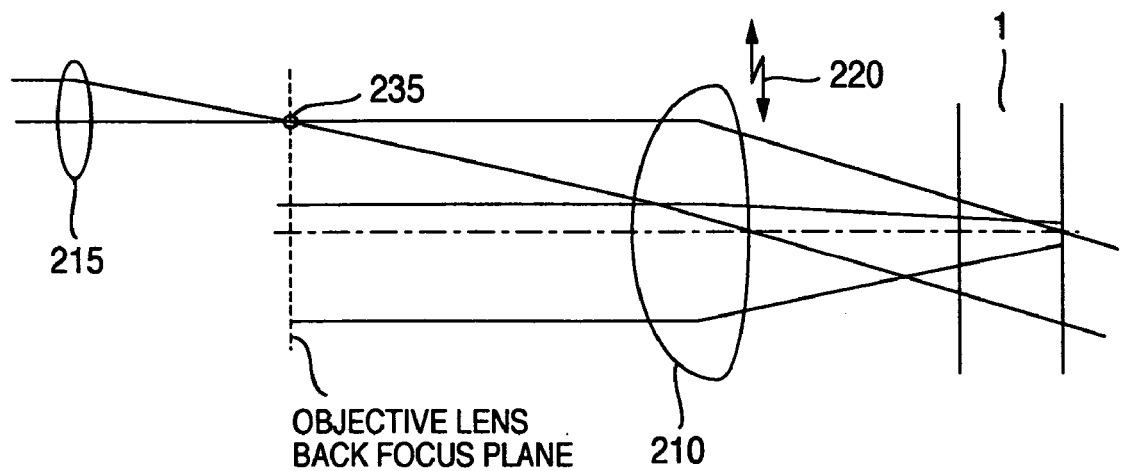
FIG. 1 is a schematic diagram showing a monocular system.
Figure 2:
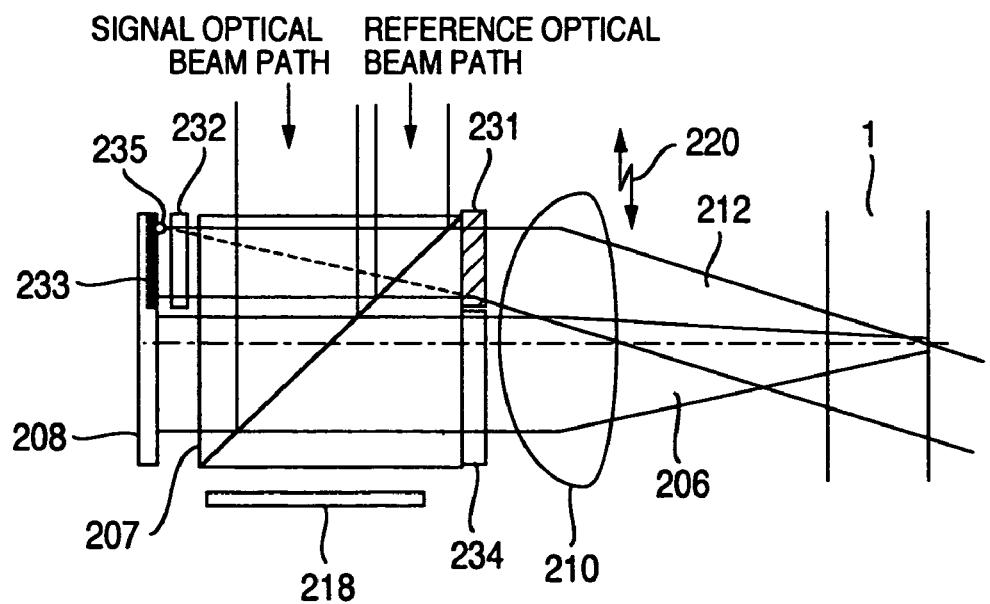
FIG. 2 is a schematic diagram showing an optical system structure near an objective lens of an optical pickup.

As described above, as shown in FIG. 1 the monocular system has a structure that the reference beam is once converged upon the back focus plane of the objective lens 210 so as to make the reference beam be applied to the optical information recording medium 1 as a parallel beam. Since a convergence point 235 of the reference beam is disposed on the back focus plane of the objective lens 210, a lens 215 for the reference beam is additionally disposed to guide the reference light beam to the lens 215. Therefore, it is necessary that, at an intermediate point in the optical path from the laser light source to the optical information recording medium 1, the reference light beam is detoured to another optical path different from the signal beam optical path, to thereby guide the reference beam to the lens 215 for converging the reference beam upon the back focus plane of the objective lens. FIG. 2 shows a structure that a detour quantity of the reference optical beam is improved so that the proportion of optical components shared by the signal optical beam and reference optical beam is further increased. The structure shown in FIG. 2 is effective for further making compact the apparatus, and it is possible to further mitigate a variation in an optical path length difference between a signal beam and a reference beam to be caused by fluctuation of atmospheric air, position displacement of optical components and the like during light propagation.

In this embodiment, as shown in FIG. 2, both the signal optical beam and reference optical beam are changed to parallel beams and incident to the PBS prism 207. The reference optical beam is reflected by the PBS prism 207, changed to a circularly polarized beam by a quarter wavelength plate 232, and reflected by a reflection plate 233. The beam reflected by the reflection plate 233 is changed to a P polarized beam by the quarter wavelength plate 232, transmits through the PBS prism 207 and becomes incident upon a lens 231. The lens 231 has a feature of a concave lens having a lens function of making the virtual convergence point 235 of the reference optical beam passed through the lens 231 be coincident with the back focus plane of the objective lens 210. The reference optical beam passed through the concave lens 231 becomes incident upon the optical information recording medium 1 via the objective lens 210 as a parallel beam.

Similarly, the signal optical beam is reflected by the PBS prism 207, and added with signal information by the spatial light modulator 208. After being reflected by the spatial light modulator 208, the signal optical beam transmits through the PBS prism 207, is changed to a desired polarization state by the polarization direction conversion elements 234, and thereafter, becomes incident upon the optical information recording medium 1 via the objective lens 210 as a converged beam.

Generally, a transmissivity and a reflection coefficient of a PBS prism have an incidence angle dependency. However, in this embodiment, with the structure that the reference optical beam is incident to the PBS prism as a parallel beam, an incidence angle at the PBS prism can be set uniquely to about 45 degrees so that there is no influence exerted by the incidence angle dependency.

Figure 3A:
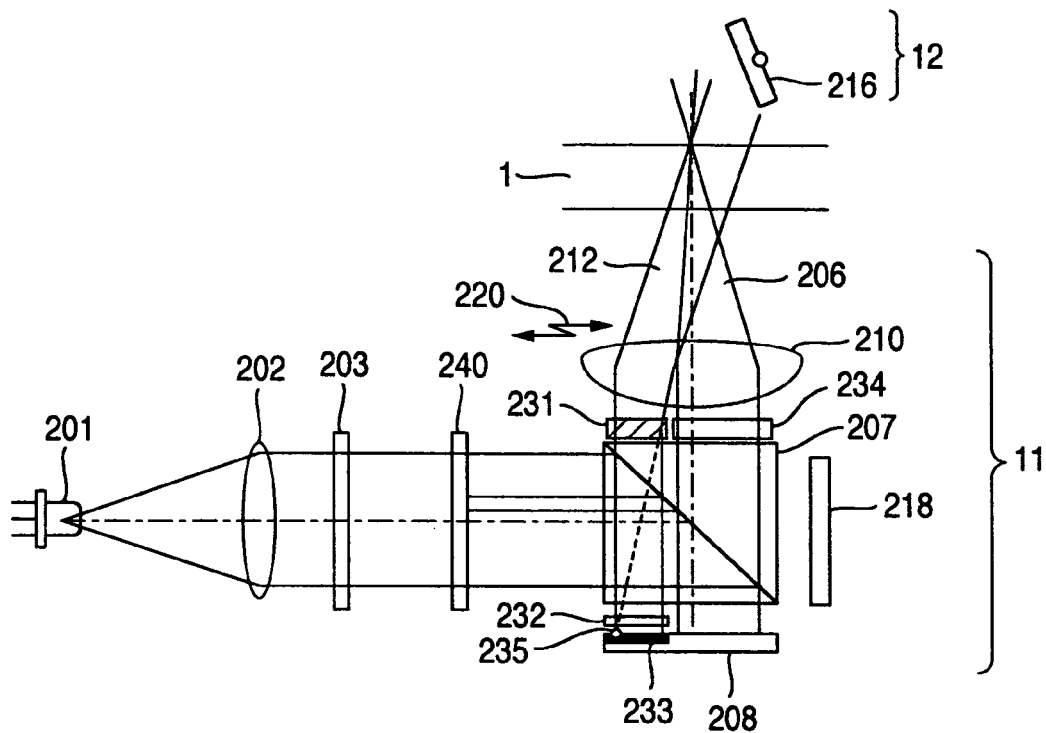
FIGS. 3A and 3B are schematic diagrams showing an optical pickup according to an embodiment.
Figure 3B:
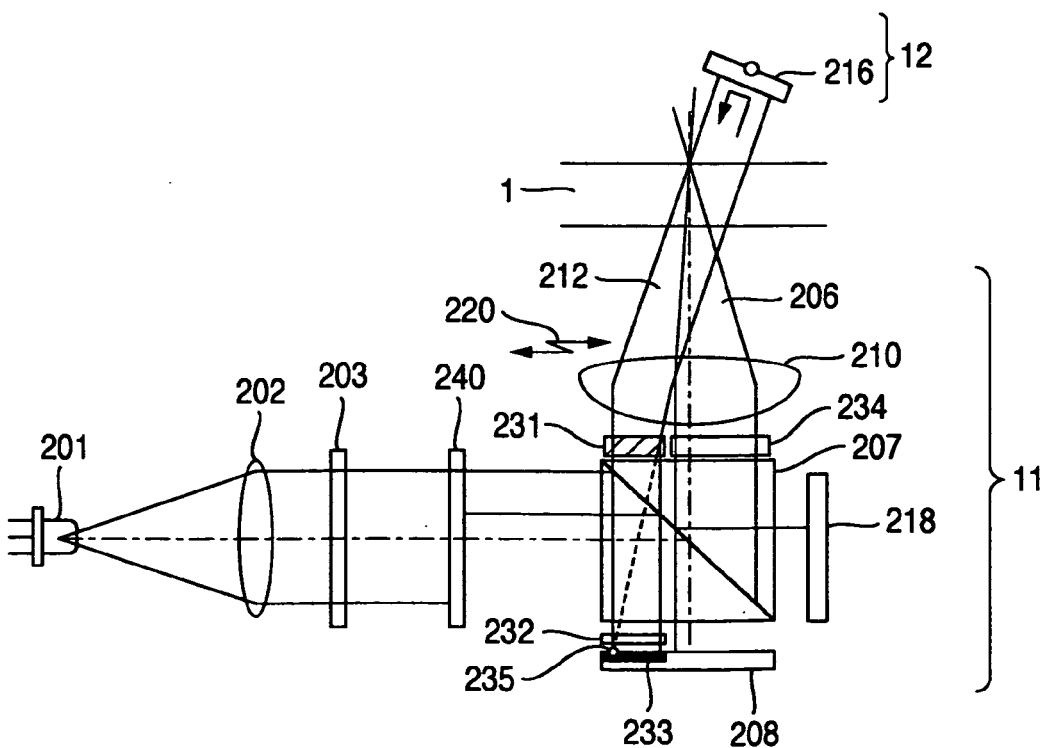

FIGS. 3A and 3B show an optical system of a holographic recording/reproducing pickup having the structure shown in FIG. 2. In recording a hologram, as shown in FIG. 3A an optical beam emitted from the light source 201 transmits through the collimator lens 202, and becomes incident upon the shutter 203. While the shutter 203 is open, the optical beam passes through the shutter 203, and thereafter becomes incident upon a shutter 240 for a signal optical beam.

Portions of the optical beam incident upon the shutter 240 become the reference optical beam and signal optical beam through area division. The reference optical beam and signal optical beam become incident upon the PBS prism 207 as parallel beams.

The reference optical beam is reflected by the PBS prism 207, changed to a circularly polarized beam by the quarter wavelength plate 232, and thereafter reflected by the reflection plate 233. The beam reflected by the reflection plate 233 is changed to a P polarized beam by the quarter wavelength plate 232, transmits through the PBS prism 207, and becomes incident upon the lens 231. The lens 231 has a feature of a concave lens having a lens function of making a virtual optical emission point 235 of the reference optical beam passed through the lens 231 be coincident with the back focus plane of the objective lens 210. The reference optical beam passed through the concave lens 231 becomes incident upon the optical information recording medium 1 via the objective lens 210 as a parallel beam.

Similarly, the signal optical beam is reflected by the PBS prism 207, and added with signal information by the spatial light modulator 208. After being reflected by the spatial light modulator 208, the signal optical beam transmits through the PBS prism 207, is changed to a desired polarization state by the polarization direction conversion elements 234, and thereafter, becomes incident upon the optical information recording medium 1 via the objective lens 210 as a converged beam.

The objective lens 210 can be driven, for example, along a direction represented by reference number 220. By displacing the position of the objective lens 210 along the drive direction 220, a relative positional relation between the objective lens 210 and the virtual optical emission points 235 on the back focus plane of the objective lens 210 changes. It is therefore possible to set an incidence angle of the reference optical beam incident upon the optical information recording medium 1 to a desired angle.

As the signal optical beam and reference optical beam are made incident upon the optical information recording medium 1 in a superposed manner, an interference fringe pattern is formed in the recording medium. By writing this pattern in the recording medium, information can be recorded. By displacing the position of the objective lens 210 along the drive direction 220, an incidence angle of the reference optical beam incident upon the optical information recording medium 1 can be changed so that angle multiplex recording can be performed.

In reproducing recorded information, as shown in FIG. 3B only the reference optical beam is made to pass through the shutter 240, and becomes incident upon the PBS prism 207 as a parallel beam. Similar to recording, the reference optical beam is incident to the optical information recording medium 1, and the optical beam transmitted through the optical information recording medium 1 is reflected by a galvano mirror 216 to form its phase conjugate beam. A reproduction optical beam reproduced by the phase conjugate beam propagates through the objective lens 210, is made to have a desired polarization state by the polarization direction conversion element 234, and thereafter is reflected by the PBS prism 207. The reproduction optical beam reflected by the PSB prism becomes incident upon the photodetector 218 so that the recorded signal can be reproduced.

The lens 231 may be a reflection type lens, a diffraction type lens having diffraction grating or may be a combination of both.

Figure 4A:
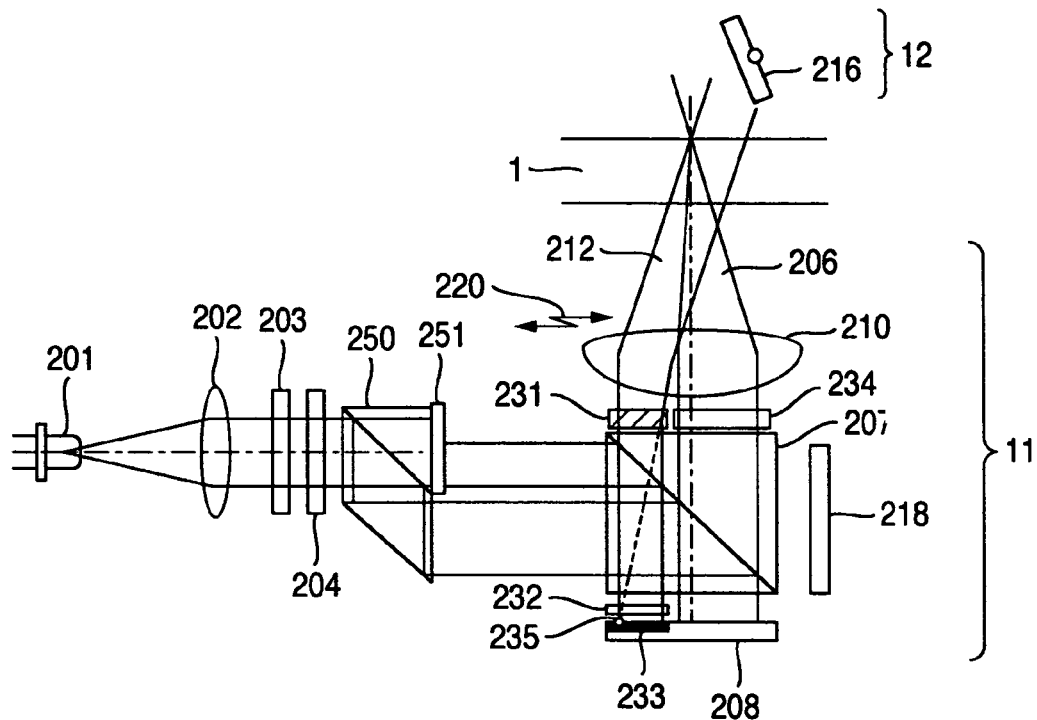
FIGS. 4A and 4B are schematic diagrams showing an optical pickup according to another embodiment.
Figure 4B:
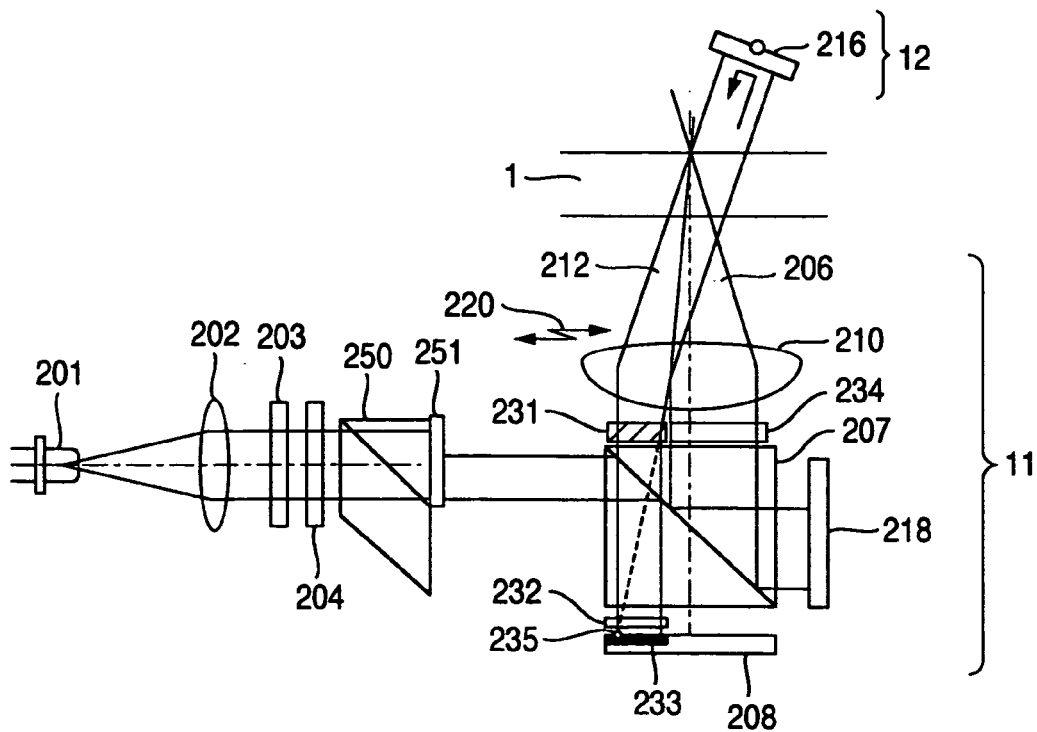

The optical system of the holographic recording/reproducing pickup may have the structure shown in FIGS. 4A and 4B.

In recording a hologram, as shown in FIG. 4A an optical beam emitted from the light source 201 transmits thorough the collimator lens 202, and becomes incident upon the shutter 203. While the shutter 203 is open, the optical beam passes through the shutter 203, thereafter is made to have a desired polarization state by the polarization direction conversion element 204. An optical beam transmitted through a PBS prism 250 is the reference optical beam, and an optical beam reflected twice in the PBS prism 250 is the signal optical beam.

The reference optical beam transmitted through the PBS prism 250 is changed from a P polarized beam to an S polarized beam by a half wavelength plate 251, and becomes incident upon the PBS prism 207 as a parallel beam. Similarly, the signal optical beam reflected by the PBS prism 250 becomes incident upon the PBS prism 207 as a parallel beam. Propagation after incidence upon the PBS prism 207 is similar to that described with reference to FIGS. 3A and 3B, and so the description thereof is omitted.

In reproducing recorded information, as shown in FIG. 4B a polarization state of the incident optical beam is changed to a P polarized beam by the polarization direction conversion element 204 so that almost all the incident optical beam transmits through the PBS prism 250 and can be used as the reference optical beam. The reference optical beam passed through the PBS prism 250 is changed from a P polarized beam to an S polarized beam by a half wavelength plate 251, and becomes incident upon the PBS prism 207 as a parallel beam. Propagation after incidence upon the PBS prism 207 is similar to that described with reference to FIGS. 3A and 3B, and so the description thereof is omitted.

In the embodiment shown in FIGS. 3A and 3B, the reference optical beam and signal optical beam are generated by area division of an optical beam emitted from the light source 201. In the structure shown in FIGS. 4A and 4B, the reference optical beam and signal optical beam are generated from the optical beam of the same area, by utilizing the polarization direction conversion element 204 and PBS prism 250. With this structure, for example, the optical beam emitted from the light source 201 can be used efficiently as the reference optical beam during reproduction, and the light usage efficiency can be improved.

Figure 5:
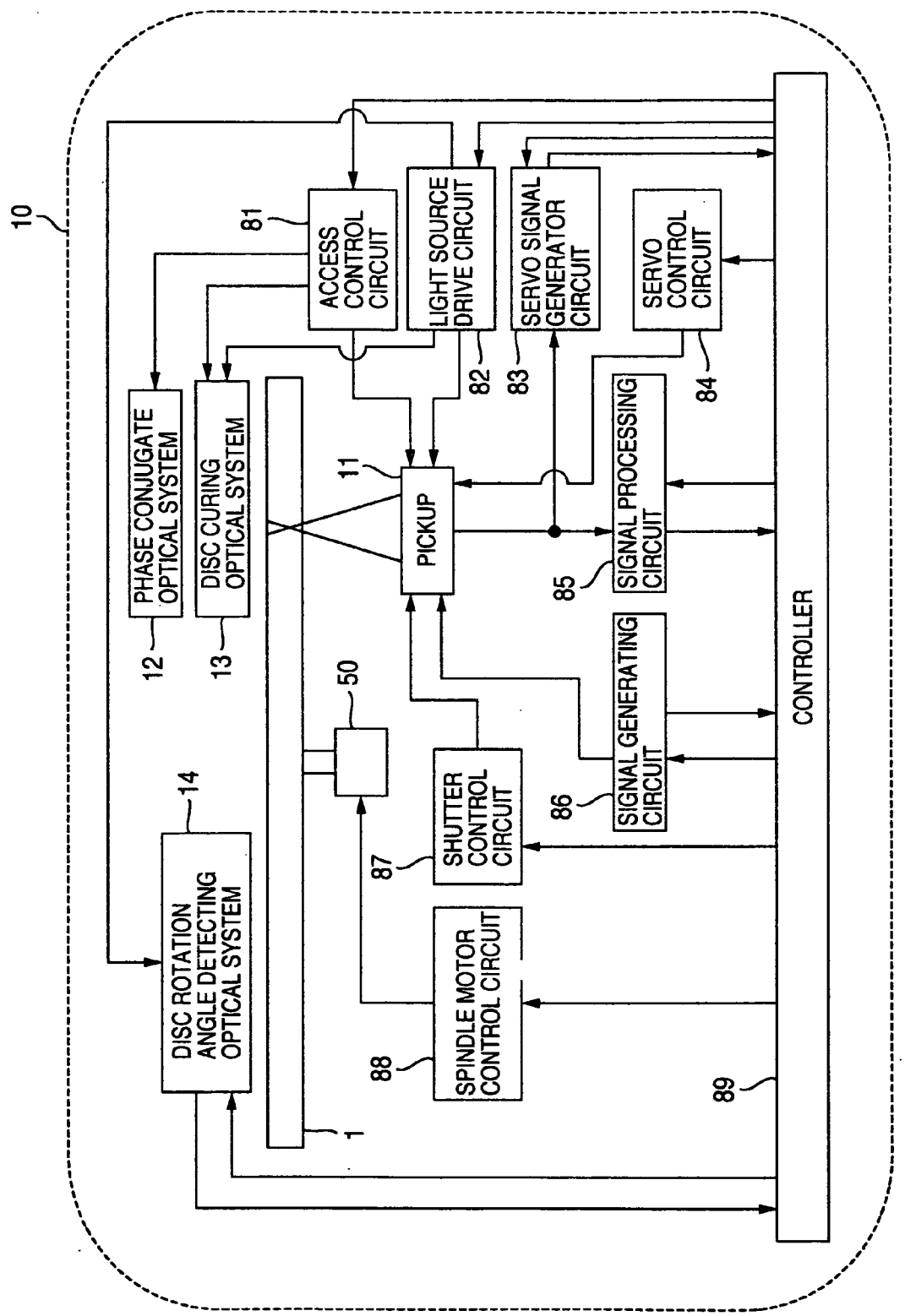
FIG. 5 is a schematic diagram showing the overall structure of an optical information recording/reproducing apparatus for recording/reproducing information.

FIG. 5 shows the overall structure of an optical information recording/reproducing apparatus for recording and/or reproducing digital information by utilizing holography.

An optical information recording/reproducing apparatus 10 is constituted of a pickup 11 shown in FIGS. 3A and 3B or FIGS. 4A and 4B, a phase conjugate optical system 12, a disc curing optical system 13, a disc rotation angle detecting optical system 14 and a rotation (spindle) motor 50. The optical information recording medium 1 is structured being able to be rotated by the rotation motor 50.

The pickup 11 has a role of recording digital information by applying a reference beam and a signal beam to the optical information recording medium 1 by utilizing photography. In performing this, a controller 89 operates to send an information signal to be recorded to a spatial light modulator in the pickup 11 to be described later via a signal generator circuit 86, and the signal beam is modulated by the spatial light modulator.

In reproducing information recorded in the optical information recording medium 1, a phase conjugate optical system 12 generates a phase conjugate beam of the reference beam emitted from the pickup 11. A phase conjugate beam is an optical beam having the same wavefront as that of the input beam and propagating in a direction opposite to that of the input beam. A reproduction beam reproduced by the phase conjugate beam is detected with a photodetector in the pickup 1 to be described later, and reproduced by a signal processing circuit 85.

An application time of the reference beam and signal beam applied to the optical information recording medium 1 can be adjusted in such a manner that the controller 89 controls an open/close time of a shutter in the pickup 11 to be described later via a shutter control circuit 87.

A disc curing optical system 13 has a role of generating an optical beam to be used for pre-cure and post-cure of the optical information recording medium 1. Pre-cure is a pre-process of, when information is to be recorded in the optical information recording medium 1 at a desired position, applying a predetermined optical beam before the reference beam and signal beam are applied to the desired position. Post-cure is a post-process of, after information is recorded in the optical information recording medium 1 at a desired position, applying a predetermined optical beam to the desired position in order to make unable to overwrite information at the desired position.

A disc rotation angle detecting optical system 14 is used for detecting a rotation angle of the optical information recording medium 1. In adjusting the optical information recording medium 1 to have a predetermined rotation angle, the disc rotation angle detecting optical system 14 detects a signal corresponding to a rotation angle, and by using the detected signal, the controller 89 can control a rotation angle of the optical information recording medium 1 via a spindle motor control circuit 88.

A light source drive circuit 82 supplies a predetermined light source drive current to light sources in the pickup 11, disc curing optical system 13 and disc rotation angle detecting optical system 14, and each of the light sources can emit an optical beam having a predetermined light quantity.

The pickup 11, phase conjugate optical system 12 and disc curing optical system 13 have each a mechanism for sliding a position of the optical information recording medium 1 in a radial direction, to perform position control via an access control circuit 81.

Recording techniques utilizing holography are techniques capable of recording ultra high density information. There is therefore a tendency that an error allowance for a shift of inclination and dislocation of the optical information recording medium 1 becomes extremely small. The pickup 11 may have a mechanism for detecting a shift quantity of, e.g., a shift quantity having a small error allowance such as inclination and dislocation of the optical information recording medium 1, and the optical information recording/reproducing apparatus 10 may have a servo mechanism in which a servo signal generator circuit 83 generates a servo control signal and a servo control circuit 84 corrects the shift quantity.

The pickup 11, phase conjugate optical system 12, disc curing optical system 13, and disc rotation angle detecting circuit 14 may be constituted of several optical system structures or may be constituted of one optical structure integrating all optical systems to simplify the structure.

Figure 6A:
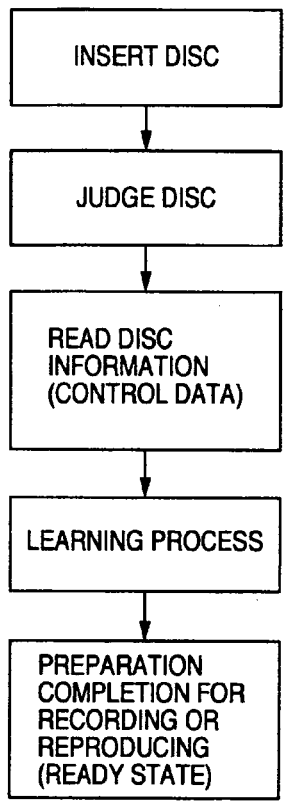
FIGS. 6A to 6C are schematic diagrams illustrating recording/reproducing operation flows of the optical information recording/reproducing apparatus.
Figure 6B:
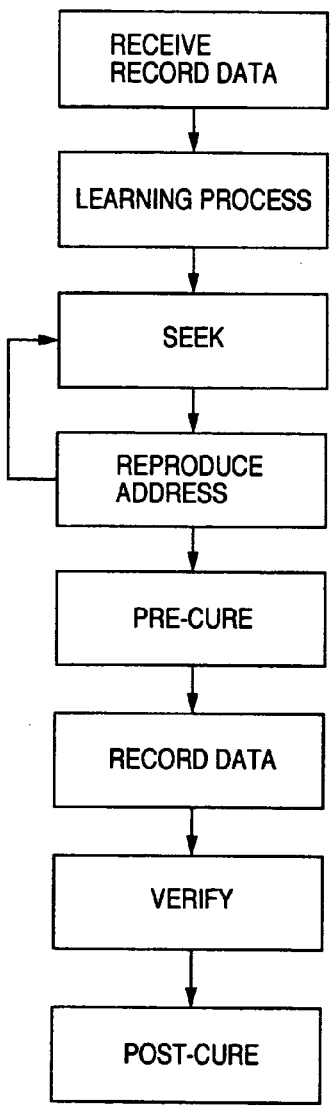
Figure 6C:
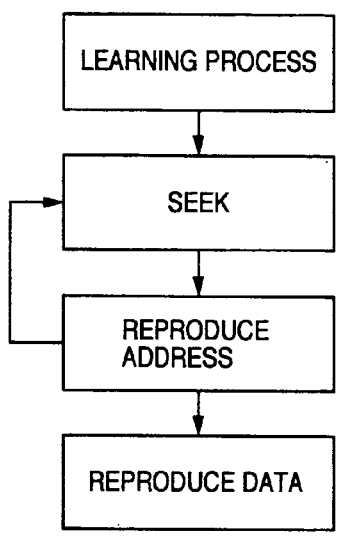

FIGS. 6A to 6C show recording/reproducing operation flows of the optical information recording/reproducing apparatus 10. Description will be made on the recording/reproducing operation flows utilizing, in particular, holography.

FIG. 6A shows an operation flow from insertion of the optical information recording medium 1 into the optical information recording/reproducing apparatus 10 to completion of preparation for recording or reproducing, FIG. 6B shows an operation flow from the preparation completion state to recording information in the optical information recording medium optical information recording medium 1, and FIG. 6C shows an operation flow from the preparation completion state to reproducing information recorded in the optical information recording medium 1.

As shown in FIG. 6A, as a medium is inserted, the optical information recording/reproducing apparatus 10 judges whether the inserted medium is, for example, a medium for recording or reproducing digital information by utilizing holography. If the disc judgment result indicates an optical information recording medium for recording or reproducing digital information by utilizing holography, then the optical information recording/reproducing apparatus 10 reads control data provided in the optical information recording medium, to acquire, for example, information on the optical information recording medium and information on various setting conditions during recording and reproducing. After the control data is read, various adjustments corresponding to the control data and learning processes for the pickup 11 are performed so that the optical information recording/reproducing apparatus 10 completes preparation for recording or reproducing.

In the operation flow from the preparation completion state to recording information, as shown in FIG. 6B data to be recorded is first received, and information corresponding to the received data is sent to the spatial light modulator in the pickup 11. Thereafter, various learning processes are executed beforehand if necessary in order to allow high quality information to be recorded in the optical information recording medium, and while a seek operation and an address reproduction operation are repetitively performed, the pickup 11 and disc curing optical system 13 are disposed at predetermined positions of the optical information recording medium. Thereafter, by using an optical beam emitted from the disc curing optical system 13, a predetermined area is pre-cured, and data is recorded by using a reference beam and a signal beam emitted from the pickup 11. After the data is recorded, data is verified if necessary, and post-cure is performed by using an optical beam emitted from the disc curing optical system 13.

In the operation flow from the preparation completion state to reproducing information, as shown in FIG. 6C various learning processes are executed beforehand if necessary in order to allow high quality information to be reproduced from the optical information recording medium. Thereafter, while a seek operation and an address reproduction operation are repetitively performed, the pickup 11 and phase conjugate optical system 12 are disposed at predetermined positions of the optical information recording medium. Thereafter, by making the pickup 11 emit a reference beam, information recorded in the optical information recording medium is read.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications which fall within the ambit of the appended claims.

The invention claimed is:

1. An optical pickup for recording information in a holographic storage medium and/or for reproducing information from a holographic storage medium comprising:
   a laser light source;
   a beam splitter which separates an optical beam generated from the laser light source into a reference beam and a signal beam;
   a spatial light modulator which modulates intensity and/or phase distribution of the signal beam;
   a PBS prism which guides the signal beam to the spatial light modulator, guides the modulated signal beam to the holographic storage medium during recording, and guides the reference beam to the holographic storage medium during at least one of the recording and reproducing; and
   an objective lens through which the reference beam and the signal beam pass prior to entering the holographic storage medium,
   wherein:
   the signal beam and the reference beam pass through the PBS prism as parallel beams; and
   a concave lens is placed on a reference beam path just before the objective lens.

2. The optical pickup according to claim 1, wherein the reference beam passes through the holographic storage medium as a parallel beam.

3. The optical pickup according to claim 2, wherein when the optical beam generated from the laser light source is separated into the reference beam and the signal beam, the optical beam is divided into an area using as an optical beam for the reference beam and an area using as an optical beam for the signal beam.

4. The optical pickup according to claim 2, wherein when the optical beam generated from the laser light source is separated into the reference beam and the signal beam, the optical beam is separated into an optical beam for the reference beam and an optical beam for the signal beam, by utilizing a difference in polarization.

5. The optical pickup according to claim 1, wherein a virtual light source of the reference beam incident upon the objective lens is positioned on a back focal plane of the objective lens.

6. An apparatus for recording information in a holographic storage medium and/or for reproducing information from a holographic storage medium comprising:
   a laser light source;
   a beam splitter which separates an optical beam generated from the laser light source into a reference beam and a signal beam;
   a spatial light modulator which modulates intensity and/or phase distribution of the signal beam;
   a PBS prism which guides the signal beam to the spatial light modulator, guides the modulated signal beam to the holographic storage medium during recording, and guides the reference beam to the holographic storage medium during at least one of the recording and reproducing; and
   an objective lens through which the reference beam and the signal beam pass prior to entering the holographic storage medium,
   wherein:
   the signal beam and the reference beam pass through the PBS prism as parallel beams; and
   a concave lens is placed on a reference beam path just before the objective lens; and
   when information is recorded in the medium and/or when information is reproduced from the medium, the reference beam passes through the medium as a parallel beam.

* * * * *